United States Patent [19]
Galatha et al.

[11] 3,885,871
[45] May 27, 1975

[54] DOCUMENT PHOTOGRAPHY SYSTEM

[75] Inventors: Matthew J. Galatha, Vestal; Richard F. Tynan, Endwell, both of N.Y.

[73] Assignee: International Business Machines Corporation, Armonk, N.Y.

[22] Filed: Apr. 12, 1974

[21] Appl. No.: 460,321

[52] U.S. Cl. ................................. 355/23; 355/24
[51] Int. Cl. ........................................ G03b 27/32
[58] Field of Search ............................... 355/23, 24

[56] References Cited
UNITED STATES PATENTS
2,747,462  5/1956  Jones .................................... 355/24
3,212,399  10/1965  Walter ................................. 355/24

Primary Examiner—John M. Horan
Attorney, Agent, or Firm—Paul M. Brannen

[57] ABSTRACT

A document photography system in which the front and rear sides of serially fed continuously moving documents are imaged on an image receptor surface, such as photographic film, which is periodically advanced. An improved optical system utilizing first and second sets of fixed mirrors and fixed common reflecting surfaces provide front and rear images of the document in which the long dimensions of the document images are perpendicular to the direction of the film motion, and the front and rear images of a given document are located end-to-end transversely of the film surface. The width of incoming documents is sensed and the film motion is incremented by amounts proportional to the indicated width of the documents.

1 Claim, 10 Drawing Figures

DOCUMENT PHOTOGRAPHY SYSTEM

FIELD OF THE INVENTION

This invention relates generally to document photography, and particularly to an improved document photography system employing a minimum number of fixed mirrors, without prisms, to provide for end-to-end imaging of serially fed documents transversely across the film, and arranged to economize on the amount of film required.

DESCRIPTION OF THE PRIOR ART

Document photographic systems are known in which the front and rear of documents are photographed, both with the document moving and stationary or the film moving or stationary, utilizing flow camera techniques and flash camera techniques. However, such prior systems are characterized by slow speed and/or mechanical complexity, including complicated optical systems. Also, some of the prior systems were designed to utilize film spacing or feed based on maximum document size, which is wasteful of film when documents of mixed size are being photographed.

SUMMARY OF THE INVENTION

It is a principal object of the present invention to provide an improved document photography system having a simplified optical system.

A more particular object of the present invention is to provide a document photography system arranged to utilize film spacing in accordance with the size of the documents being photographed.

Another object of the invention is to provide an improved system of the type described in which each document presented to the system has its width indicated, and the recording film is incremented proportionally to thereby increase the utilization of the film.

A further object of the invention is to provide an improved system of the type described in which the width of an incoming document is indicated and employed to govern an incremental capstan drive for advancing only sufficient film to photograph the document.

Other objects of the invention and features of novelty and advantages thereof will become apparent from the detailed description to follow, taken in connection with the accompanying drawings.

In practicing the invention, the system comprises a suitable serial feed document transport system by which the documents are successively presented to the recording station, one by one, in continuous motion. At least a portion of the document transport is arranged so that the front and rear sides of the documents are in full view. At these locations first and second sets of fixed mirrors convey images of the front and rear sides of the documents to a first common path mirror, from which the images are reflected to a second common path mirror. From this second mirror the images are supplied through an objective lens to the recording surface of a photographic film web. The optical parts are disposed and arranged so that the front and rear sides of a document are imaged transversely across the film width, in an end-to-end relationship.

The film is advanced or incremented through the camera assembly by a capstan drive controlled to move the film in increments. The total amount of film advance is governed by a capstan control which takes into account the indicated width of the documents. To accomplish this, document width is sensed prior to the arrival of each document at the imaging station. This information is then stored, and utilized to determine the duration of motion of the capstan drive, so that the film is advanced only sufficiently to properly image the full width of the document.

GENERAL DESCRIPTION OF THE DRAWINGS

Figure 5:
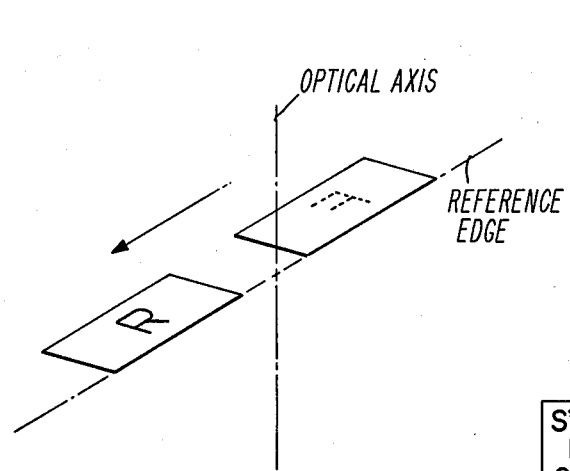
Figure 8:
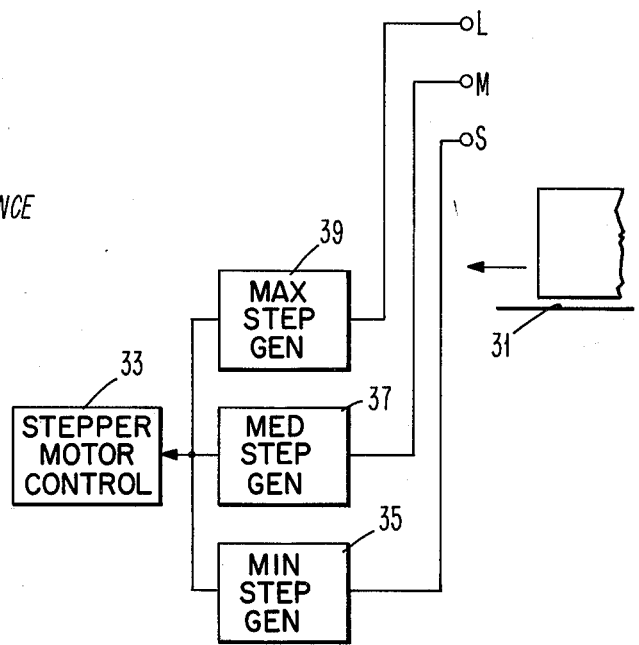
Figure 6:
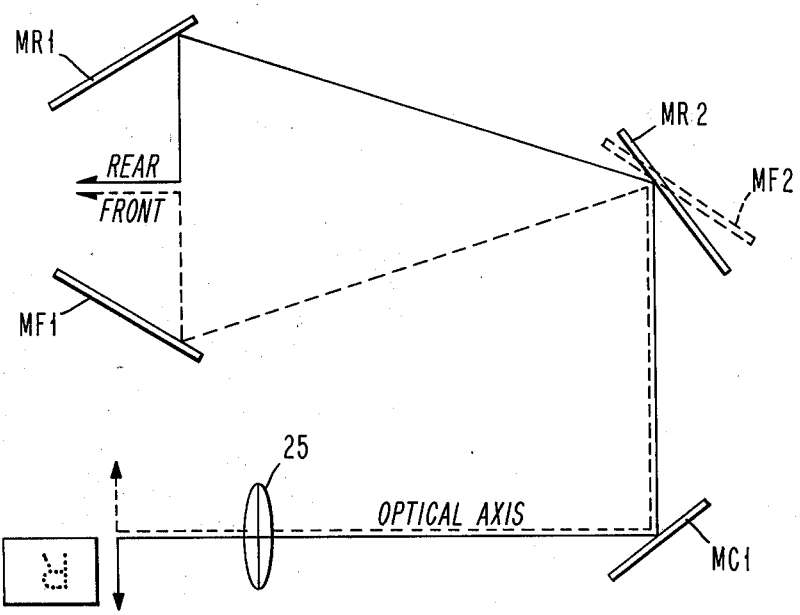
Figure 7A:
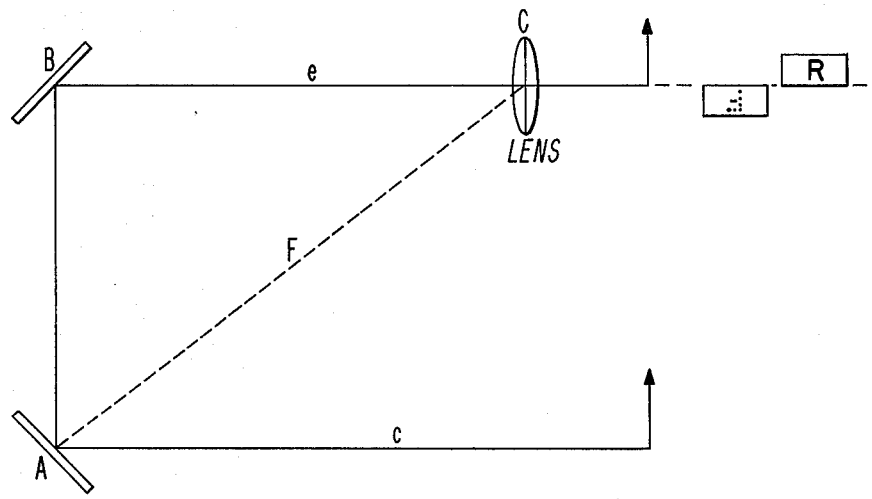
Figure 7B:
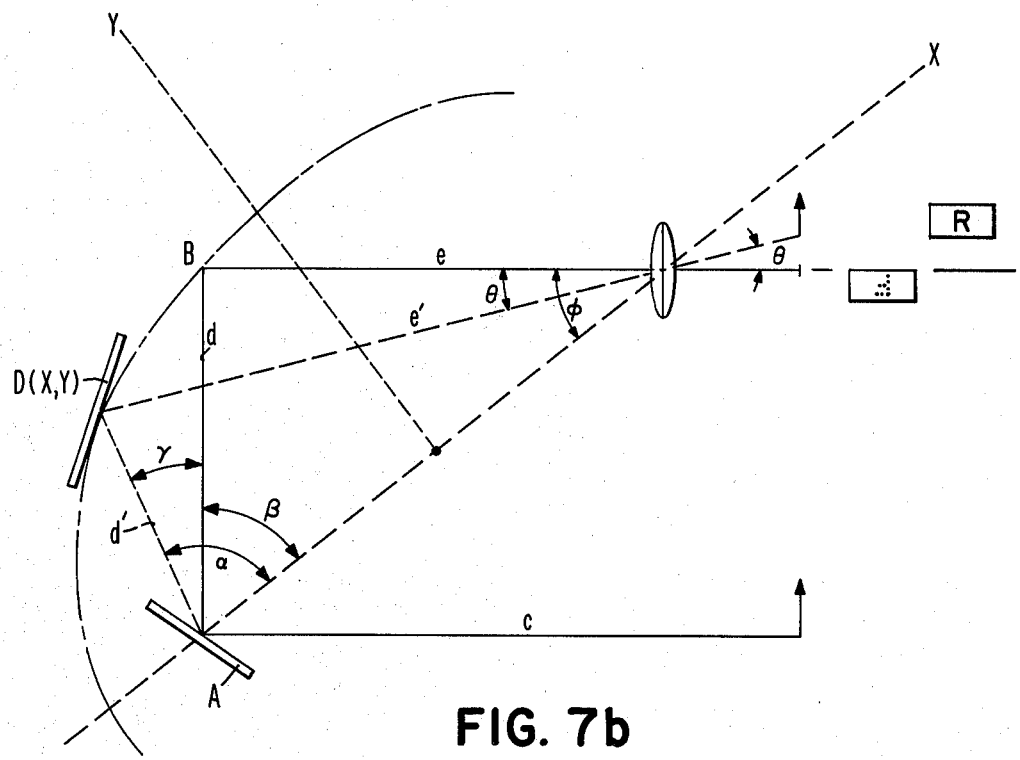

FIGS. 5 and 6 further illustrate the relationships of the optical system;

FIGS. 7a and 7b illustrate certain geometrical and trigonometrical relations found in the optical system; and FIG. 8 illustrates one form of document width sensor and capstan control which may be utilized with the present invention.

Similar reference characters refer to similar parts in each of the several views.

DESCRIPTION OF PREFERRED EMBODIMENT

Figure 1:
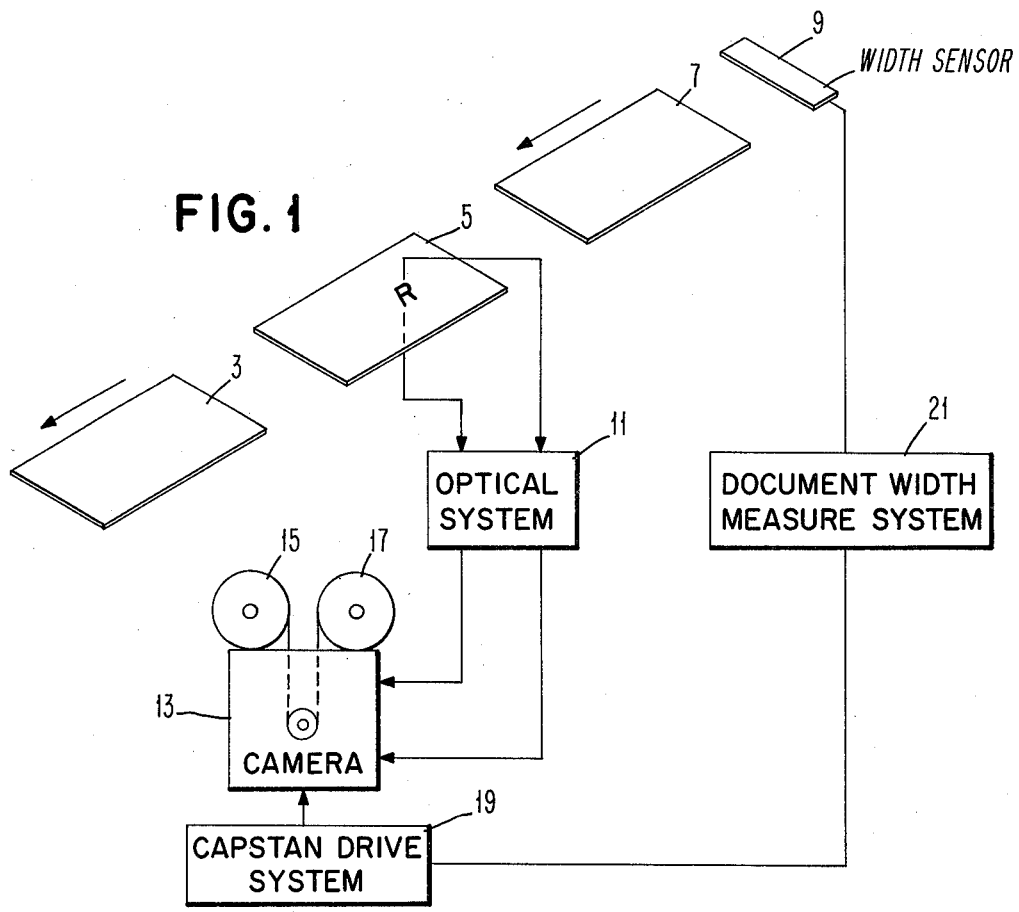
FIG. 1 is a highly schematic illustration showing the general configuration of a preferred embodiment of the invention.

Referring to FIG. 1, there is shown in schematic form a document photography system embodying the present invention. Documents such as 3, 5 and 7 are serially transported by means not shown in succession along their longest dimension through a path which carries them past a width sensor 9, to an imaging station where an optical system 11 forms appropriate images of the front and rear faces of the document, and supplies these images to a camera 13. The camera includes a supply reel 15 and takeup reel 17 which may be arranged in cassette form so as to be readily loadable into the camera assembly. As indicated by the dotted lines, a film web is fed down into the camera where it is fed past a lens system included in the optical system 11, so that the images of the front and rear of the document are captured on the film web. The film is transported through the camera by a capstan which is driven by a capstan drive system 19, under the control of a document width measure system 21.

As the documents move along the document path, the width sensor 9 measures the width of each document and supplies appropriate information to the capstan drive system so that the film is advanced by an optimum amount such that it can capture the proper images of the document, but with minimum waste, as would be found in a system where the film would have to be advanced each time by the amount necessary to capture the images of a maximum width document.

Figure 2A:
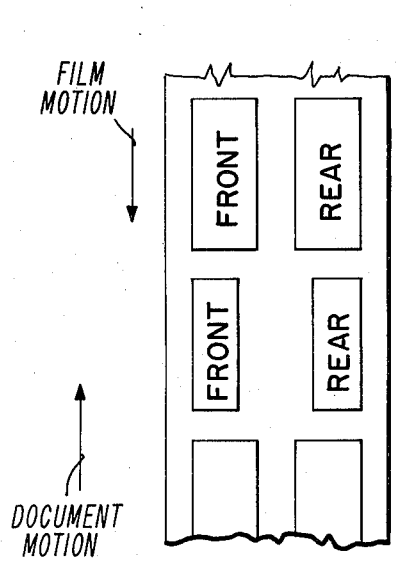
FIGS. 2a and 2b show the image format as exemplified by the prior art and the present invention, respectively.
Figure 2B:
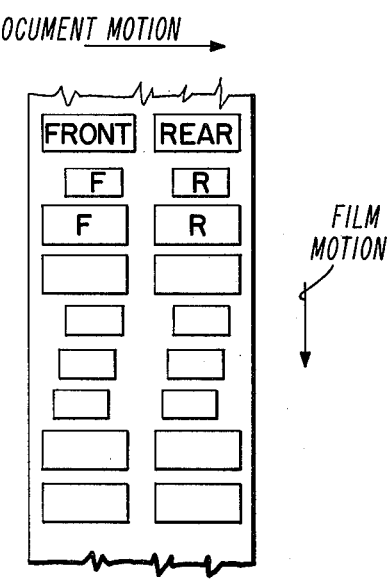

FIGS. 2a and 2b are schematic illustrations of the arrangement of the document images on the film web, FIG. 2a showing an arrangement which is found in certain conventional and known flow cameras, and FIG. 2b showing the arrangement found in the present system. It will be noticed that in the flow camera arrangement, the film motion and document motion are in opposite directions and along the axis of the film web.

With such an arrangement, the successive documents have the front and rear sides thereof transversely disposed across the web as shown, with the long axis of the documents parallel to the long axis of the film or web.

On the other hand, in the present arrangement shown in FIG. 2b it will be noticed that the film motion and document motion are orthogonal and the front and rear images of each document are located transversely of the film web, as can be seen in the drawing.

Figure 3:
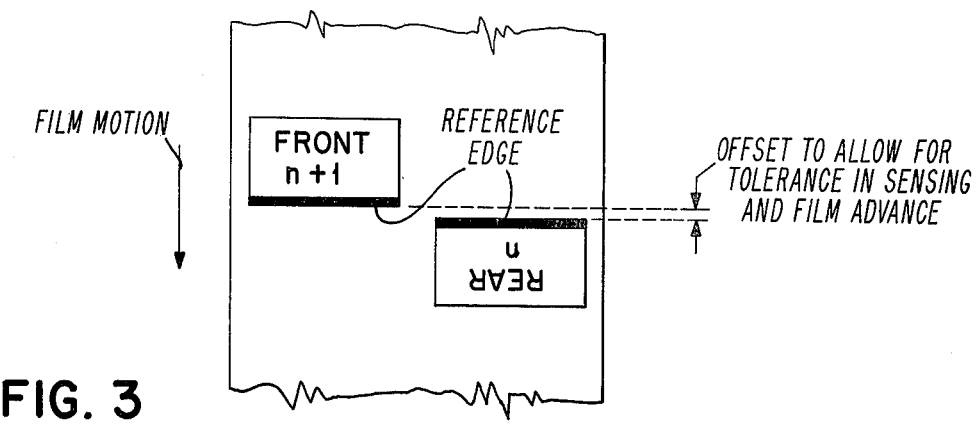
FIG. 3 shows the relationship of front and rear side images as viewed through the film base.

FIG. 3 illustrates in greater detail the disposition of the images on the film. These images are right-handed, that is to say, right reading when viewed through the film base as shown in the drawing. This is the standard orientation for the loading and reading of microfilm viewers known in the art. It will be noticed that the bottom edges of the rear face of the nth document and the front face of the $n + 1$ document are aligned to a common reference edge with a slight offset to allow for tolerance in sensing and film advance motion. The rear image of the nth document and the front image of the $n + 1$ document are thus presented to the film in such a way that the reference edge on each document is oriented and aligned in the image plane, thereby allowing film advancement to be incremental by an amount proportional to the measured width of the document being recorded in the front exposure station. As stated previously, document width is measured prior to entrance of the document into the exposure station, and this width information is used to control the following film advance.

Figure 4:
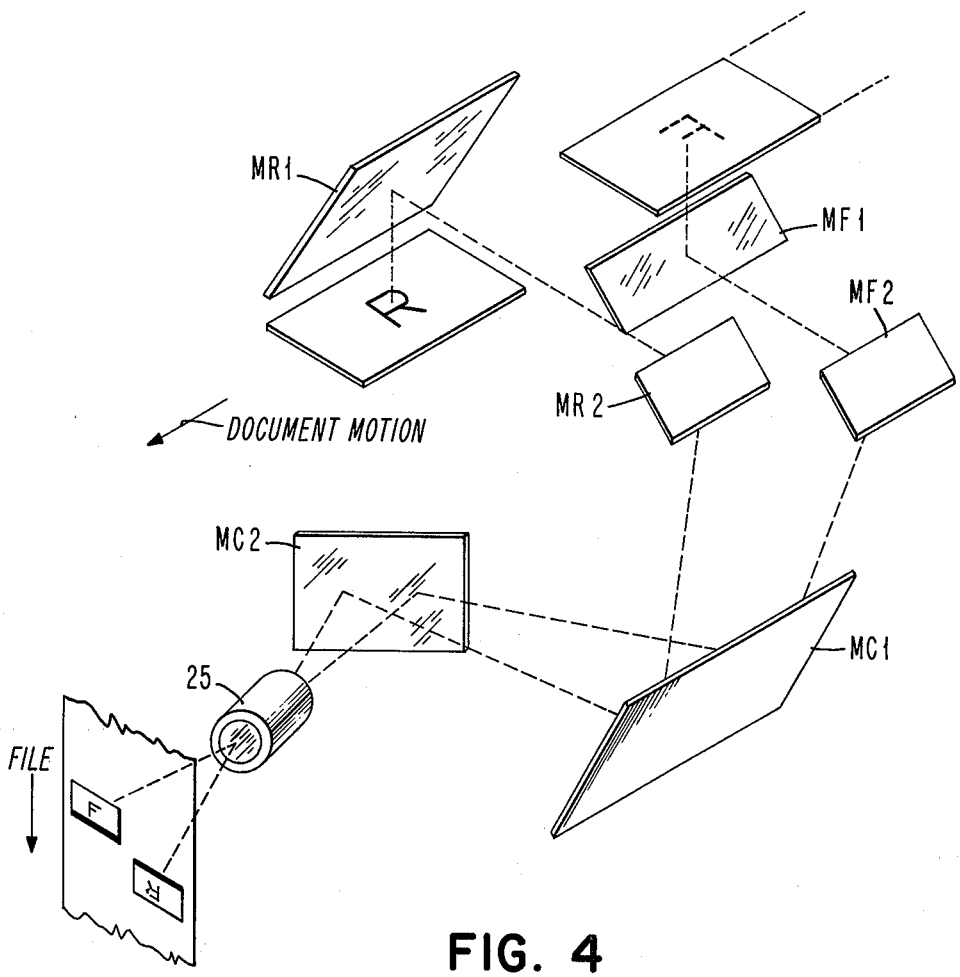
FIG. 4 illustrates in perspective view the optical system of the present invention.

FIG. 4 is a schematic perspective view, showing the relationship of the parts in a preferred form of optical system of the present invention. The system consists of a reduction lens 25 and folded optical paths obtained by the use of first and second common mirrors MC1 and MC2 respectively, and two mirrors in each of the front and back image optical paths respectively, the mirrors for the front path being designated as MF1 and MF2, while those for the rear path are designated MR1 and MR2. These mirrors are independently adjustable. An even number of reflections in each path consistent with each other with respect to inversion or reversion are required to satisfy the imaging conditions. To obtain the orientation desired requires that two mirrors in one path, either front or rear, be angularly adjusted and longitudinally translated along the optical axis to produce the desired image shift while maintaining equal optical paths in the system.

Inspection of FIG. 4 will show the manner in which the front and rear sides of each document have their images supplied through the folded optical path and via the lens 25 through the appropriate locations on the film.

In this multiple path folded optical system, the offset position of the front and rear images is achieved by placing the optical axis of the system through the common line denoting the reference or aligned edge of the documents as shown in FIG. 5.

FIG. 6 is a generalized side view of the optical system showing the manner in which the arrangement of the optics provides the necessary image offset. In order to obtain greater offset in the image position to provide spacing between sequential documents on the recording media, two mirrors in one of the optical paths must be adjustable to provide the appropriate image shift while maintaining their path lengths equal. Such adjustment consists of rotation of one of the mirrors with rotation and translation of the second mirror.

The method for determining the proper amount of rotation and translation of the mirrors to provide the desired results is illustrated by an example utilizing the showings of FIGS. 7a and 7b of the drawings.

The intersection of the optical axis with the first mirror and the principal plane of the lens define the two foci of an ellipse with the second mirror falling on and tangent to the ellipse. In this instance, the one focus of the ellipse is at the point on mirror A where the lines $c$ and $d$ intersect, and the second focus is on the center line of the lens at the point intersected by line $e$. The common mirrors are not illustrated. To obtain a shift of angle $\theta$ in the image position, the second mirror must be translated to a point on the ellipse determined by the intersection of the shifted image array and the ellipse surface, designated as point D in FIG. 7b. The mirror must lie tangent to the ellipse surface at this point. The first mirror angle is then angularly adjusted so that the ray d intersects the ellipse at D.

The general equation for the ellipse is $$\frac{x^2}{a^2} + \frac{y^2}{b^2} = 1$$

where
$a =$ semi-major axis $b =$ semi-minor axis
and the coordinate system axes are along the major and minor axes.

From Fig. 7b $$a = \frac{d+e}{2}$$
$$b = a\sqrt{1-E^2}$$

$f =$ distance between 2 foci $= 2\,a\,E$
$E =$ eccentricity $= f/(d+e)$

For a shift in image position of $\theta$, the new position D $(x, y)$ of the second mirror is $$x = -\frac{E^2 - E\cos(\phi - \theta)}{1 - E\cos(\phi - \theta)}$$

$$y = \sqrt{a^2(1-\epsilon^2) - (1-E^2)x^2}$$

The slope of mirror MR 2 at point $(x, y)$ which is tangent to the ellipse is $m$, where $$y = mx \pm \sqrt{a^2 m^2 + b^2}$$

Mirror MR1 is rotated through an angle $\gamma/2$ where $\gamma = \alpha - \beta$.

With the mirrors adjusted in accordance with the above equations, the image locations on the film surface relative to the fixed reference will be such as to achieve optimum packing density of the images on the film.

It should be noted that if a folded optical path is not required, the common mirrors are not necessary and can be eliminated, and the optical system will still function as described above to provide the appropriate images on the film.

As pointed out earlier, optimum use of the film is obtained by advancing the film by increments proportional to the width of the documents to be photographed, in connection with the previously described optical system in which the front and rear faces of successive documents are brought to a common reference line, so that the gaps or unused segments of the film strip are minimized, thereby achieving a maximum utilization of the film as compared with prior systems in which the film was advanced through a fixed increment that was at least as large as the space necessary to photograph the largest documents presented to the system. Since documents of varying size are photographed, the document width is indicated and utilized to govern the film advance system.

Width detection per se can be accomplished in a number of known ways, and the arrangement illustrated schematically in FIG. 8 is only intended to show one general form which may be used.

The documents, aligned to a suitable reference surface 31, move past the sensor station in the direction shown by the arrow.

A plurality of sensing elements, such as S, M and L, are aligned across the document path as shown, so that one or more of the sensors will detect the passage of the document, depending upon the document width, i.e., a small document will not affect any of the sensors, a somewhat larger document will affect only sensor S, a medium document will affect sensors S and M, and a large width document will affect sensors S, M and L. The sensors may be of any of the well known types, such as photoresponsive, pneumatic, or sonic, and their exact form is not pertinent to the invention. Suffice it to say that the width sensors provide one or more outputs which are indicative of the width of passing documents.

The signals from the sensors are supplied to means such as the step generators shown, which in turn supply appropriate numbers of driving pulses to a stepping motor control 33. The stepping impulse generators 35, 37 and 39 are arranged so that upon the supply thereto of a signal from the associated sensor there will be supplied to the control 33, predetermined numbers of pulses, increasing in value in accordance with the sensed width.

Accordingly, the stepper motor control 33 will be governed so that it will drive the film capstan through varying numbers of increments, to thereby advance the film in steps which in the aggregate are proportional to the width of the oncoming document. It is to be noted that the width sensing and film drive can take any of numerous forms, and that shown is exemplary only.

From all of the foregoing, it will be apparent that this invention provides an improved document photography system in which a system of first and second sets of fixed mirrors direct images of the front and rear sides of a document, as seen at successive imaging stations, to transversely located positions on the recording film, with the image edges brought to a common reference, whereby, when the film is advanced in accordance with the width of the documents being photographed, minimum lengths of film will be required.

While the invention has been particularly shown and described with reference to a preferred embodiment thereof, it will be understood by those skilled in the art that various changes in form and details may be made therein without departing from the spirit and scope of the invention.

We claim:

1. In a document photography system for photographing on a photographic film both front and rear sides of elongate documents traveling serially and end to end, the combination comprising a reduction lens system, a first set of fixed mirrors aligned to reflect the image of the front side of one of said documents to be photographed to said lens system, and a second set of fixed mirrors aligned to reflect the image of the reverse side of the document to be photographed to said lens system, said lens system and said mirrors being aligned to project said images on the film surface which are aligned with respect to a common reference line, said common reference line being perpendicular to the length of the film, with the images having their long sides parallel to said reference line and having the orientation of said first and second set of fixed mirrors such that the images generated by the documents being fed end to end serially are presented transverse to the image receiving surface of the film, document transport means for conveying said documents serially and end to end past said first and said second sets of mirrors, film advancing means for feeding said photographic film, width sensing means for indicating the width of documents as they are fed through the system, and means governed by said width sensing means for advancing the film in increments proportional to the width of the documents being photographed.

* * * * *